(12) United States Patent
Wang et al.

(10) Patent No.: US 10,317,724 B2
(45) Date of Patent: Jun. 11, 2019

(54) LIQUID CRYSTAL DISPLAY PANEL AND METHOD FOR FORMING THE SAME, DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Mengjie Wang, Beijing (CN); Xiaona Liu, Beijing (CN); Yuqiong Chen, Beijing (CN); Shuai Yuan, Beijing (CN); Ning Li, Beijing (CN); Yufei Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 113 days.

(21) Appl. No.: 15/678,857

(22) Filed: Aug. 16, 2017

(65) Prior Publication Data

US 2018/0088410 A1    Mar. 29, 2018

(30) Foreign Application Priority Data

Sep. 23, 2016 (CN) .......................... 2016 1 0849589

(51) Int. Cl.
*G02F 1/1335* (2006.01)
*G02F 1/1333* (2006.01)

(52) U.S. Cl.
CPC .. *G02F 1/133528* (2013.01); *G02F 1/133308* (2013.01); *G02F 1/133371* (2013.01);
(Continued)

(58) Field of Classification Search
CPC ......... G02F 1/133528; G02F 1/133371; G02F 1/133308; G02F 1/133609; G02F 1/133514; G02F 1/133611
See application file for complete search history.

(56) References Cited

U.S. PATENT DOCUMENTS

| 2013/0038811 A1* | 2/2013 | Sugita | G02B 27/22 349/61 |
| 2016/0195742 A1* | 7/2016 | Kim | G02F 1/133788 349/33 |

(Continued)

FOREIGN PATENT DOCUMENTS

| CN | 1932606 A | 3/2007 |
| CN | 203365855 U | 12/2013 |

(Continued)

OTHER PUBLICATIONS

First Office Action for Chinese Application No. 201610849589.1, dated Nov. 5, 2018, 7 Pages.

*Primary Examiner* — Huyen L Ngo
(74) *Attorney, Agent, or Firm* — Brooks Kushman P.C.

(57) ABSTRACT

A liquid crystal display panel and a method for forming the same and a display device are provided. The liquid crystal display panel includes two substrates opposite to each other and two polarizing plates at two sides of the two substrates away from each other. There exists a large cell gap region between the two substrates which has a cell gap larger than regions between the two substrates other than the large cell gap region, each polarizing plate includes a first polarizing layer, and at least one of the polarizing plates further includes a second polarizing layer. The second polarizing layer includes a pattern region corresponding to a position and a shape of the large cell gap region. There is an acute (Continued)

angle between a light absorption axis of the second polarizing layer at the pattern region and a light absorption axis of the first polarizing layer.

14 Claims, 3 Drawing Sheets

(52) U.S. Cl.
CPC .. *G02F 1/133514* (2013.01); *G02F 1/133609* (2013.01); *G02F 1/133611* (2013.01)

(56) References Cited

U.S. PATENT DOCUMENTS

| | | | |
|---|---|---|---|
| 2016/0252773 A1 | | 9/2016 | Kim et al. |
| 2018/0239200 A1* | | 8/2018 | Chen ................ G02F 1/134309 |

FOREIGN PATENT DOCUMENTS

| | | |
|---|---|---|
| CN | 104122704 A | 10/2014 |
| KR | 20080044650 A | 5/2008 |

* cited by examiner

LIQUID CRYSTAL DISPLAY PANEL AND METHOD FOR FORMING THE SAME, DISPLAY DEVICE

CROSS-REFERENCE TO RELATED APPLICATION

This application claims priority to Chinese Patent Application No. 201610849589.1 filed on Sep. 23, 2016, which is incorporated herein by reference in its entirety.

TECHNICAL FIELD

The present disclosure relates to the field of display technology, and in particular to a liquid crystal display panel and a method for forming the same and a display device.

BACKGROUND

During a manufacturing process of a liquid crystal display panel, affected by the design, process, material or device, there may be a large cell gap region at a display region of a display device, and a transmittance of the large cell gap region is larger than that of the other regions. When then display device displays an image, the large cell gap region may be lighter, and thus a color cast may occur.

In a liquid crystal display panel with a narrow frame border in the related art, limited by the design and production conditions at present, the cell gap of a periphery portion of the display panel may be larger than other portions. As a result, a display brightness of the periphery portion of the display panel ay may be larger than other portions, and thus a color cast may occur at the periphery portion of the display panel, which may appear as that the display image at the periphery portion of the display panel may appears to be white or yellow. As a result, display effect of the display panel may be adversely affected.

SUMMARY

The present disclosure provides a liquid crystal display panel and a method for forming the same and a display device, so as to solve the display color cast due to the large cell gap region of the liquid crystal display panel and improve the liquid crystal display effect of the display panel.

To achieve the above objective, the present disclosure provides the following solutions.

A liquid crystal display panel is provided in the present disclosure, including two substrates opposite to each other and two polarizing plates at two sides of the two substrates away from each other, where there exists a large cell gap region between the two substrates which has a cell gap larger than regions between the two substrates other than the large cell gap region, each polarizing plate includes a first polarizing layer, and at least one of the polarizing plates further includes a second polarizing layer, where each second polarizing layer includes a pattern region corresponding to a position and a shape of the large cell gap region, and an orthogonal projection of the pattern region onto the two substrates covers the large cell gap region; in each polarizing plate having the second polarizing layer, there is an acute angle between a light absorption axis of the second polarizing layer at the pattern region and a light absorption axis of the first polarizing layer.

According to the liquid crystal display panel in at least one embodiment of the present disclosure, the polarizing plate provided with the second polarizing layer is arranged at at least one side of the two substrates, every large cell gap region between the two substrates is covered by the first polarizing layer and the pattern region of the second polarizing layer. The angle between the light absorption axes of the first polarizing layer and the second polarizing layer, so a part of the light beams may be absorbed by the adjacent two polarizing layers. Therefore, the light beams transmitted from the large cell gap region is reduced by the first and second polarizing layers covering the large cell gap region, thereby reducing the transmittance of the large cell gap region. By adjusting the angle between the light absorption axes of the adjacent two polarizing layers, a brightness of the large cell gap region covered by the two polarizing layers may be reduced and become uniform with the other regions, thereby solving the display color cast caused by the relatively high transmittance of the large cell gap region of the display panel and improving the display effect of the display panel.

Optionally, a transmittance of the two substrates and the two polarizing plates at a position corresponding to the large cell gap region is smaller than or equal to a transmittance of the two substrates and the two polarizing plates at a position corresponding to the regions between the two substrates other than the large cell gap region.

Optionally, the large cell gap region includes at least two sub-regions having different cell gaps, the pattern region of at least one second polarizing layer includes at least two sections adjacent to each other, and each sub-region corresponds to at least one section.

Optionally, in each polarizing plate having the second polarizing layer, the angle θ between the light absorption axis of the second polarizing layer at the pattern region and the light absorption axis of the first polarizing layer is equal to arcos(b/a), where b is an intensity of light beams passing through the polarizing plate at a light-transmitting side from the regions between the two substrates other than the large cell gap region, and a is an intensity of light beams passing through the polarizing plate at the light-transmitting side from the large cell gap region.

Optionally, each polarizing plate having the second polarizing layer further includes a planarization layer at a layer identical to the second polarizing layer, and the planarization layer is arranged at a portion of the second polarizing layer other than the pattern region.

Optionally, the planarization layer is made of a photocuring adhesive.

Optionally, the large cell gap region between the two substrates is annular and at a periphery of the two substrates, and the pattern region of each second polarizing layer is annular.

Optionally, the two substrates opposite to each other are an array substrate and a color filter substrate respectively, the two polarizing plates are a first polarizing plate and a second polarizing plate respectively, the first polarizing plate is at a side of the array substrate away from the color filter substrate, and the second polarizing plate is at a side of the color filter substrate away from the array substrate.

Optionally, an orthogonal projection of the pattern region of the second polarizing layer onto the two substrates at least partially overlaps an orthogonal projection of the large cell gap region onto the two substrates.

Optionally, an area of the orthogonal projection of the pattern region of the second polarizing layer onto the two substrates is larger than an area of the orthogonal projection of the large cell gap region onto the two substrates.

Optionally, the angles between the light absorption axes of the respective sections of the pattern region of the second polarizing layer and the light absorption axis of the first polarizing layer are difference from each other, to enable the intensities of the light beams transmitted from the respective sub-regions to be uniform.

A display device including the above liquid crystal display panel is further provided in the present disclosure.

A method for forming the above liquid crystal display panel is further provided in the present disclosure, including: determining, based on the position and the shape of the large cell gap region between the two substrates opposite to each other, a position and a shape of the pattern region of the second polarizing layer of at least one polarizing plate; determining, based on the transmittance of the two substrates at the position corresponding to the large cell gap region, the angle between the light absorption axis of the second polarizing layer at the pattern region and the light absorption axis of the first polarizing layer; forming the second polarizing layer having the pattern region at a side of the first polarizing layer of at least one polarizing plate; and attaching the polarizing plate having the second polarizing layer onto at least one of the two substrates.

Optionally, the forming the second polarizing layer having the pattern region at a side of the first polarizing layer of at least one polarizing plate includes: forming a polarizing base layer at a side of the first polarizing layer of the polarizing plate; and removing the polarizing base layer covering the regions between the two substrates other than the large cell gap region, to form the second polarizing layer having the pattern region.

DRAWING REFERENCES

01—large cell gap region; 11—first substrate; 12—second substrate; 13—liquid crystal layer; 21—first polarizing plate; 211—first polarizing layer; 212—second polarizing layer; 213—protection layer; 214—supporting layer; 215—planarization layer; 22—second polarizing plate

DETAILED DESCRIPTION

The present disclosure will be described hereinafter in a clear and complete manner in conjunction with the drawings related to the embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
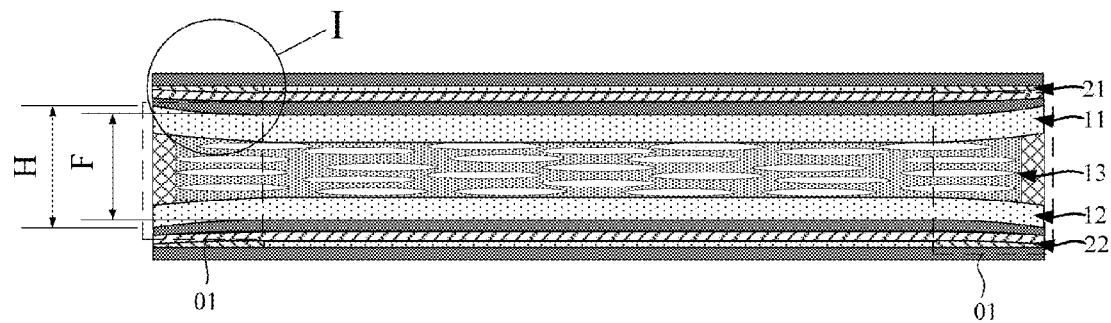
FIG. 1 is a schematic view of a liquid crystal display panel in at least one embodiment of the present disclosure.

A liquid crystal display panel is provided in at least one embodiment of the present disclosure. As shown in FIG. 1 which is a schematic view of a liquid crystal display panel in at least one embodiment of the present disclosure, the liquid crystal display panel includes a first substrate 11 and a second substrate 12 opposite to each other and a first polarizing plate 21 arranged at a side of the first substrate 11 away from the second substrate 12 and a second polarizing plate 22 arranged at a side of the second substrate 12 away from the first substrate 11. In at least one embodiment of the present disclosure, the two substrates are an array substrate and a color filter substrate respectively, a liquid crystal layer 13 is arranged between the two substrates, and the two polarizing plates are a polarizer plate and a polarization detection plate respectively. A relative position of the two substrates and the two polarizing plates is not limited herein, as long as the two polarizing plates are arranged at two sides of the two substrates away from each other.

Referring to FIG. 1, there is a large cell gap region 01 between the first substrate 11 and the second substrate 12, and a cell gap H of the large cell gap region 01 is larger than a cell gap F of the other region. During a process of manufacturing the display panel, affected by the design, process, material or device, there may be one or a plurality of large cell gap regions 01, and the large cell gap regions 01 may be distributed at any position between the first substrate 11 and the second substrate 12. A transmittance of the large cell gap region 01 is larger than that of a region with a normal cell gap, therefore an intensity of light beams transmitted from the large cell gap region 01 is larger than an intensity of light beams transmitted from the region with the normal cell gap. As a result, the part of image displayed by the large cell gap region 01 may be relatively brighter and thus a color cast may occur.

Figure 2A:
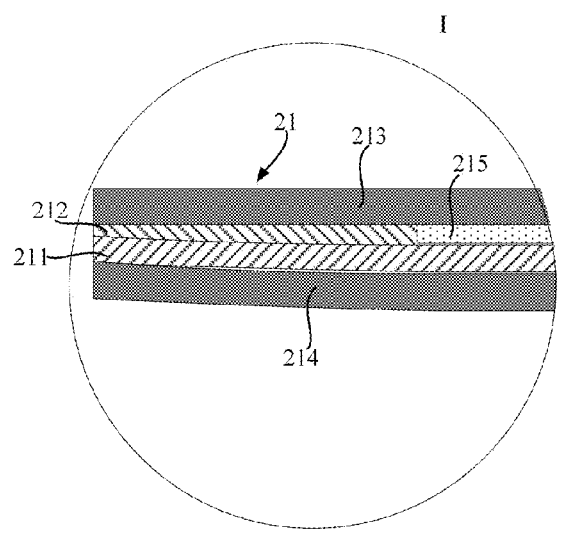
FIG. 2(a) is a schematic view showing a portion of a first polarizing plate in at least one embodiment of the present disclosure.

Referring to FIG. 2(a) which is a schematic view showing a portion of the first polarizing plate 21, the first polarizing plate 21 includes a first polarizing layer 211. In at least one embodiment of the present disclosure, at least one of the first polarizing plate 21 arranged at the side of the first substrate 11 away from the second substrate 12 and the second polarizing plate 22 arranged at the side of the second substrate 12 away from the first substrate 11 is provided with a first polarizing layer 211, and each polarizing plate is further provided with a protection layer 213, a supporting layer 214 and other layer structures. In addition, the first polarizing layer may be made of a PVA-iodine material, and the detailed description thereof is omitted herein.

Referring to FIG. 2(a), the first polarizing plate is further provided with a second polarizing layer, and the second polarizing layer 212 includes a pattern region corresponding to a position and a shape of the large cell gap region 01. In at least one embodiment of the present disclosure, an orthogonal projection of the pattern region of the second polarizing layer 212 onto the first substrate 11 and the second substrate 12 covers all the large cell gap regions, and a shape of the orthogonal projection of the pattern region of the second polarizing layer 212 onto the first substrate 11 and the second substrate 12 corresponds to a shape of the large cell gap region. In at least one embodiment of the present disclosure, an area of the orthogonal projection of the pattern region of the second polarizing layer 212 onto the first substrate 11 and the second substrate 12 may be equal to or larger than an area of an orthogonal projection of the large cell gap region 01 onto the first substrate 11 and the second substrate 12. In at least one embodiment of the present disclosure, at least one of the two polarizing plates is provided with the second polarizing layer, or both the two polarizing plates are provided with the second polarizing layers respectively.

Figure 3:
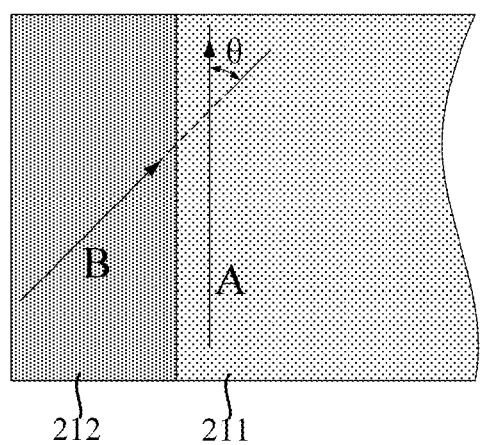
FIG. 3 is a schematic view showing a portion of a first polarizing plate in at least one embodiment of the present disclosure.

Referring to FIG. 3 which is a schematic view showing a portion of the first polarizing plate 21, there is an acute angle θ between a light absorption axis B of the second polarizing layer 212 at the pattern region and a light absorption axis A of the first polarizing layer 211. All the light beams may pass through the polarizing plates in the case that the angle between the light absorption axes of the two polarizing plates is 0°, and all the light beams may pass through the polarizing plates in the case that the angle between the light absorption axes of the two polarizing plates is 90°, therefore in the case that the angle between the light absorption axis of the second polarizing layer 212 at the pattern region and the light absorption axis of the first polarizing layer 211 is an acute angle, a part of the light beams may be absorbed by the second polarizing layer 212 at the pattern region and the first polarizing layer 211.

According to the liquid crystal display panel in at least one embodiment of the present disclosure, the polarizing plate provided with the second polarizing layer is arranged at at least one side of the two substrates, every large cell gap region between the two substrates is covered by the first polarizing layer and the pattern region of the second polarizing layer. The angle between the light absorption axes of the first polarizing layer and the second polarizing layer, so a part of the light beams may be absorbed by the adjacent two polarizing layers. Therefore, the light beams transmitted from the large cell gap region is reduced by the first and second polarizing layers covering the large cell gap region, thereby reducing the transmittance of the large cell gap region. By adjusting the angle between the light absorption axes of the adjacent two polarizing layers, a brightness of the large cell gap region covered by the two polarizing layers may be reduced and become uniform with the other regions, thereby solving the display color cast caused by the relatively high transmittance of the large cell gap region of the display panel and improving the display effect of the display panel.

Optionally, in order to better solve the color cast caused by the large cell gap region, an integral transmittance of the two substrates and the two polarizing plates at a position corresponding to the large cell gap region is smaller than or equal to a transmittance of the two substrates and the two polarizing plates at a position corresponding to the regions between the two substrates other than the large cell gap region. The integral transmittance here is the transmittance of the two substrates and the two polarizing plates as a whole. The brightness of the large cell gap region may be equal to or smaller than that of the regions other than the large cell gap region, thereby solving the color cast at the large cell gap region.

In at least one embodiment of the present disclosure, the cell gap of the large cell gap region may not be uniform. Generally, the large cell gap region includes two sub-regions having different cell gaps, and thus the part of image display by the identical large cell gap region may be of different brightness. In view of this, the pattern region of at least one second polarizing layer may include at least two adjacent sections, and each sub-region corresponds to at least one section. The angles between the light absorption axes of the respective sections of the pattern region of the second polarizing layer and the light absorption axis of the first polarizing layer are difference from each other, to enable the intensities of the light beams transmitted from the respective sub-regions to be uniform.

In at least one embodiment of the present disclosure, the sub-regions may correspond to the sections of the second polarizing layer of one polarizing plate or correspond to the sections of the second polarizing layer of two polarizing plates.

Figure 2B:
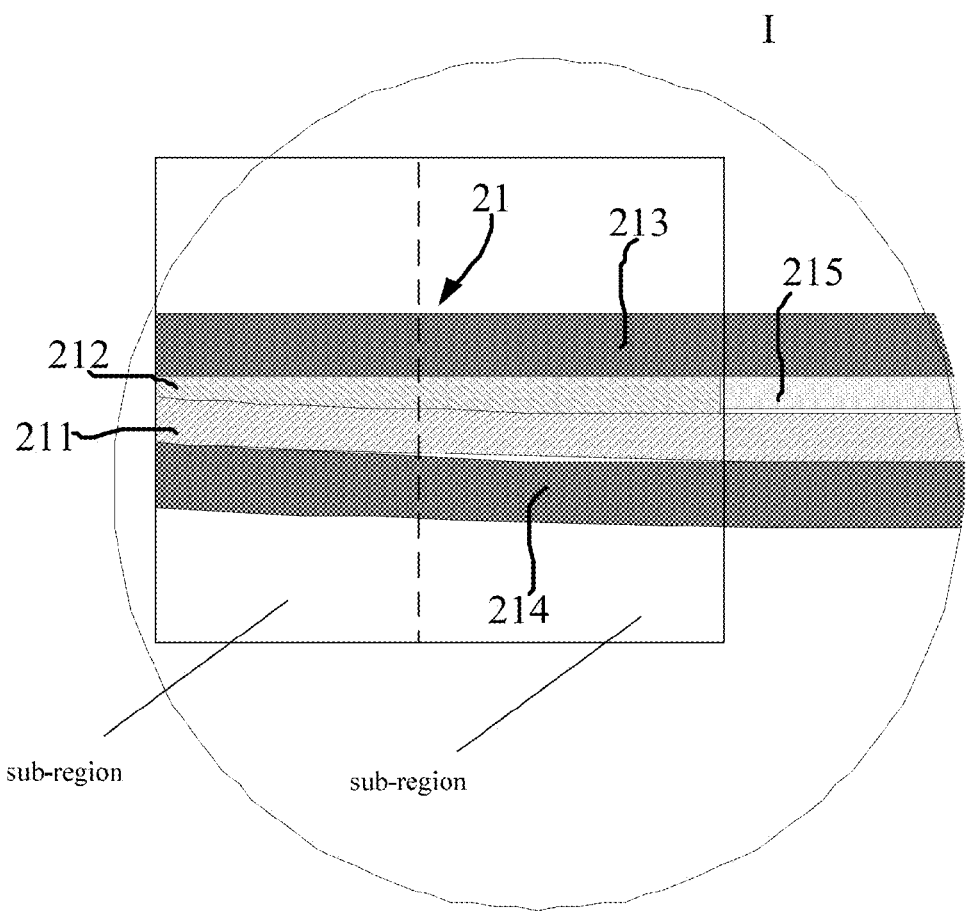
FIG. 2(b) is a schematic view showing a portion of a first polarizing plate in at least one embodiment of the present disclosure.

In at least one embodiment of the present disclosure, the sub-regions of the large cell gap region and the sections of the pattern region adjacent to each other may be arranged as shown in FIG. 2(b).

In at least one embodiment of the present disclosure, in each polarizing plate having the second polarizing layer, the angle θ between the light absorption axis of the second polarizing layer at the pattern region and the light absorption axis of the first polarizing layer is equal to arcos(b/a), where b is an intensity of light beams passing through the polarizing plate at a light-transmitting side from the regions between the two substrates other than the large cell gap region, and a is an intensity of light beams passing through the polarizing plate at the light-transmitting side from the large cell gap region.

Based on the above formula, it is able to determine the angle between the light absorption axis of the second polarizing layer at the pattern region and the light absorption axis of the first polarizing layer. In at least one embodiment of the present disclosure, the intensity b of light beams passing through the polarizing plate at the light-transmitting side from the large cell gap region and the intensity b of light beams passing through the polarizing plate at the light-transmitting side from the regions between the two substrates other than the large cell gap region may be determined based on a measurement and calculation.

As shown in FIG. 2(a), the first polarizing plate 21 having the second polarizing layer 212 further includes a planarization layer 215 at a layer identical to the second polarizing layer 212, and the planarization layer 215 is arranged at a portion of the second polarizing layer 212 other than the pattern region. The planarization layer 215 may be made of a transparent material with a high transmittance. In at least one embodiment of the present disclosure, the planarization layer is made of a photocuring adhesive. In at least one embodiment of the present disclosure, each polarizing plate having the second polarizing layer is provided with the planarization layer.

In at least one embodiment of the present disclosure, in some liquid crystal display panels especially the liquid crystal display panel with a narrow frame border, limited by the design and production conditions at present, the cell gap of a periphery portion of the display panel may be larger than other portions. In at least one embodiment of the present disclosure, the large cell gap region between the two substrates is annular and at a periphery of the two substrates, and the pattern region of each second polarizing layer is annular.

Based on the same principle, a display device including the above liquid crystal display panel is further provided in at least one embodiment of the present disclosure.

According to the display device, the display color cast caused by the relatively high transmittance of the large cell gap region of the display panel may be solved and the display effect of the display panel may be improved.

Figure 4:
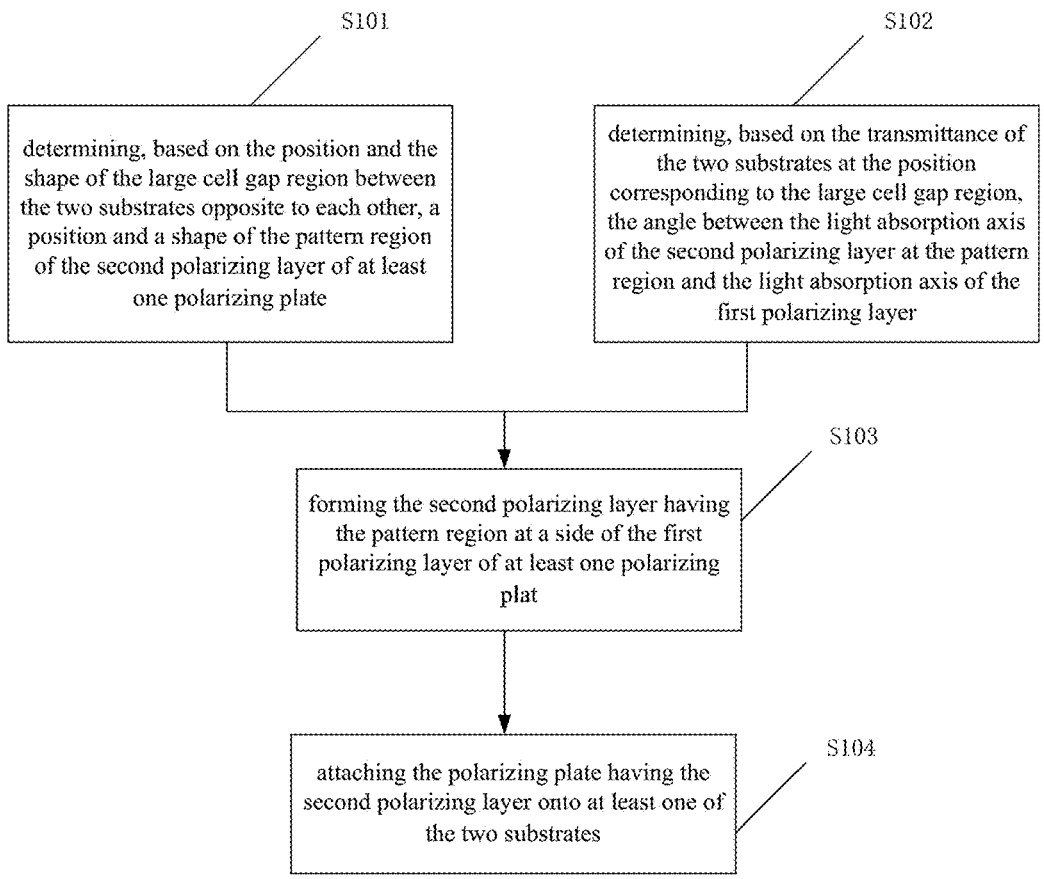
FIG. 4 is a flow chart of a method for forming a liquid crystal display panel in at least one embodiment of the present disclosure.

Based on the same principle, a method for forming the above liquid crystal display panel is further provided in at least one embodiment of the present disclosure. Referring to FIG. 4 which is a flow chart of a method for forming a liquid crystal display panel in at least one embodiment of the present disclosure, the method includes:

Step 101: determining, based on the position and the shape of the large cell gap region between the two substrates opposite to each other, a position and a shape of the pattern region of the second polarizing layer of at least one polarizing plate, where the position and the shape of the large cell gap region between the two substrates opposite to each other may be measured after the two substrate are oppositely arranged to form a cell or determined through an analysis and calculation at a design stage.

Step 102: determining, based on the transmittance of the two substrates at the position corresponding to the large cell gap region, the angle between the light absorption axis of the second polarizing layer at the pattern region and the light absorption axis of the first polarizing layer, where the transmittance of the two substrates at the position corresponding to the large cell gap region may be measured after the two substrate are oppositely arranged to form a cell or determined through an analysis and calculation at a design stage.

In at least one embodiment of the present disclosure, Step 101 and Step 102 may not be in a particular order.

Step 103: forming the second polarizing layer having the pattern region at a side of the first polarizing layer of at least one polarizing plate, where the polarizing plate formed in Step 103 is shown in FIG. 2.

Step 104: attaching the polarizing plate having the second polarizing layer onto at least one of the two substrates, where the liquid crystal display panel formed in Step 104 is shown in FIG. 1.

In at least one embodiment of the present disclosure, in Step 101, for certain display panel with a narrow frame border, the large cell gap region between the two substrates is annular and at a periphery of the two substrates, and the annular large cell gap region may be determined by an analysis and calculation at a design stage of the display panel with a narrow frame border.

According to the method for forming the liquid crystal display panel in at least one embodiment of the present disclosure, the polarizing plate provided with the second polarizing layer is arranged at at least one side of the two substrates, every large cell gap region between the two substrates is covered by the first polarizing layer and the pattern region of the second polarizing layer. The angle between the light absorption axes of the first polarizing layer and the second polarizing layer, so a part of the light beams may be absorbed by the adjacent two polarizing layers. Therefore, the light beams transmitted from the large cell gap region is reduced by the first and second polarizing layers covering the large cell gap region, thereby reducing the transmittance of the large cell gap region. By adjusting the angle between the light absorption axes of the adjacent two polarizing layers, a brightness of the large cell gap region covered by the two polarizing layers may be reduced and become uniform with the other regions, thereby solving the display color cast caused by the relatively high transmittance of the large cell gap region of the display panel and improving the display effect of the display panel.

Figure 5:
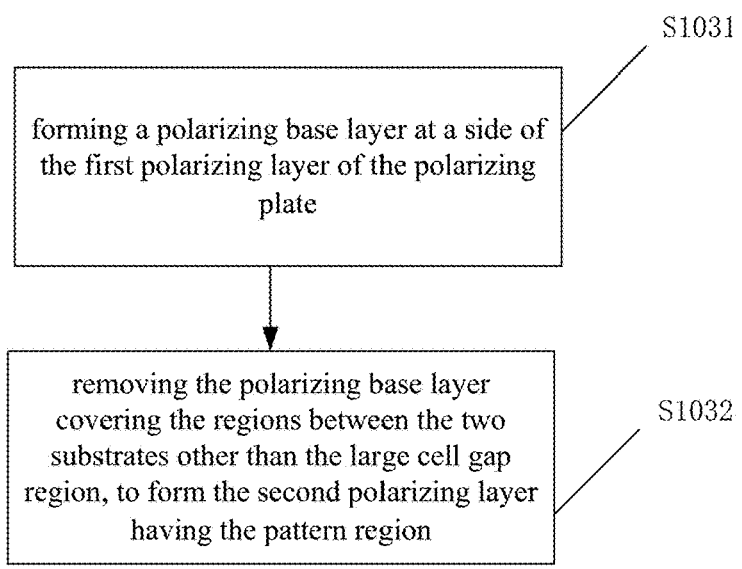
FIG. 5 is a flow chart of the Step 103 in FIG. 4.

In at least one embodiment of the present disclosure, referring to FIG. 5 which is a flow chart of the Step 103, the forming the second polarizing layer having the pattern region at a side of the first polarizing layer of at least one polarizing plate includes:

Step 1031: forming a polarizing base layer at a side of the first polarizing layer of the polarizing plate, where the polarizing base layer is a polarizing layer, and an orthogonal projection of the polarizing base layer onto the two substrates covers the entire display region of the two substrates.

Step 1032: removing the polarizing base layer covering the regions between the two substrates other than the large cell gap region, to form the second polarizing layer having the pattern region.

In at least one embodiment of the present disclosure, the polarizing base layer may be cut based on the position and shape of the large cell gap region, and then the polarizing base layer at regions other than the large cell gap region may be peeled off, and finally the remained polarizing base layer is the pattern region of the second polarizing layer.

Obviously, a person skilled in the art may make further modifications and improvements without departing from the principle of the present disclosure, and these modifications and improvements shall also fall within the scope of the present disclosure.

What is claimed is:

1. A liquid crystal display panel, comprising two substrates opposite to each other and two polarizing plates at two sides of the two substrates away from each other, wherein there exists a large cell gap region between the two substrates which has a cell gap larger than regions between the two substrates other than the large cell gap region, each polarizing plate comprises a first polarizing layer, and at least one of the polarizing plates further comprises a second polarizing layer, wherein
    each second polarizing layer comprises a pattern region corresponding to a position and a shape of the large cell gap region, and an orthogonal projection of the pattern region onto the two substrates covers the large cell gap region;
    in each polarizing plate having the second polarizing layer, there is an acute angle between a light absorption axis of the second polarizing layer at the pattern region and a light absorption axis of the first polarizing layer.

2. The liquid crystal display panel according to claim 1, wherein a transmittance of the two substrates and the two polarizing plates at a position corresponding to the large cell gap region is smaller than or equal to a transmittance of the two substrates and the two polarizing plates at a position corresponding to the regions between the two substrates other than the large cell gap region.

3. The liquid crystal display panel according to claim 2, wherein the large cell gap region comprises at least two sub-regions having different cell gaps, the pattern region of at least one second polarizing layer comprises at least two sections adjacent to each other, and each sub-region corresponds to at least one section.

4. The liquid crystal display panel according to claim 3, wherein the angles between the light absorption axes of the respective sections of the pattern region of the second polarizing layer and the light absorption axis of the first polarizing layer are difference from each other, to enable the intensities of the light beams transmitted from the respective sub-regions to be uniform.

5. The liquid crystal display panel according to claim 2, wherein
    in each polarizing plate having the second polarizing layer, the angle $\theta$ between the light absorption axis of the second polarizing layer at the pattern region and the light absorption axis of the first polarizing layer is equal to arcos(b/a), wherein b is an intensity of light beams passing through the polarizing plate at a light-transmitting side from the regions between the two substrates other than the large cell gap region, and a is an intensity of light beams passing through the polarizing plate at the light-transmitting side from the large cell gap region.

6. The liquid crystal display panel according to claim 1, wherein each polarizing plate having the second polarizing layer further comprises a planarization layer at a layer identical to the second polarizing layer, and the planarization layer is arranged at a portion of the second polarizing layer other than the pattern region.

7. The liquid crystal display panel according to claim 6, wherein the planarization layer is made of a photocuring adhesive.

8. The liquid crystal display panel according to claim 1, wherein the large cell gap region between the two substrates is annular and at a periphery of the two substrates, and the pattern region of each second polarizing layer is annular.

9. The liquid crystal display panel according to claim 1, wherein the two substrates opposite to each other are an array substrate and a color filter substrate respectively, the two polarizing plates are a first polarizing plate and a second polarizing plate respectively, the first polarizing plate is at a side of the array substrate away from the color filter substrate, and the second polarizing plate is at a side of the color filter substrate away from the array substrate.

10. The liquid crystal display panel according to claim 1, wherein an orthogonal projection of the pattern region of the second polarizing layer onto the two substrates at least partially overlaps an orthogonal projection of the large cell gap region onto the two substrates.

11. The liquid crystal display panel according to claim 10, wherein an area of the orthogonal projection of the pattern region of the second polarizing layer onto the two substrates is larger than an area of the orthogonal projection of the large cell gap region onto the two substrates.

12. A display device, comprising the liquid crystal display panel according to claim 1.

13. A method for forming the liquid crystal display panel according to claim 1, comprising:
- determining, based on the position and the shape of the large cell gap region between the two substrates opposite to each other, a position and a shape of the pattern region of the second polarizing layer of at least one polarizing plate;
- determining, based on the transmittance of the two substrates at the position corresponding to the large cell gap region, the angle between the light absorption axis of the second polarizing layer at the pattern region and the light absorption axis of the first polarizing layer;
- forming the second polarizing layer having the pattern region at a side of the first polarizing layer of at least one polarizing plate; and
- attaching the polarizing plate having the second polarizing layer onto at least one of the two substrates.

14. The method according to claim 13, wherein the forming the second polarizing layer having the pattern region at a side of the first polarizing layer of at least one polarizing plate comprises:
- forming a polarizing base layer at a side of the first polarizing layer of the polarizing plate; and
- removing the polarizing base layer covering the regions between the two substrates other than the large cell gap region, to form the second polarizing layer having the pattern region.

* * * * *